US008354814B2

(12) United States Patent
Yang

(10) Patent No.: US 8,354,814 B2
(45) Date of Patent: Jan. 15, 2013

(54) FAN SYSTEM CIRCUIT MODULE

(75) Inventor: Jian-Lin Yang, Shenzhen (CN)

(73) Assignee: Asia Vital Components (China) Co., Ltd., Shenzhen (CN)

( * ) Notice: Subject to any disclaimer, the term of this patent is extended or adjusted under 35 U.S.C. 154(b) by 675 days.

(21) Appl. No.: 12/574,686

(22) Filed: Oct. 6, 2009

(65) Prior Publication Data

US 2011/0080128 A1    Apr. 7, 2011

(51) Int. Cl.
*H02P 7/00* (2006.01)

(52) U.S. Cl. .............. 318/434; 318/400.21; 318/400.22

(58) Field of Classification Search ............. 318/400.21, 318/400.22, 400.26, 400.29, 434
See application file for complete search history.

(56) References Cited

U.S. PATENT DOCUMENTS

| | | | | |
|---|---|---|---|---|
| 4,992,718 A * | 2/1991 | Kumaki | ........................ | 318/768 |
| 5,449,988 A * | 9/1995 | Gurstein et al. | ............. | 318/430 |
| 6,023,139 A * | 2/2000 | Chin | .............................. | 318/434 |
| 6,147,465 A * | 11/2000 | Hollenbeck | .............. | 318/400.26 |
| 6,313,597 B1 * | 11/2001 | Elliott et al. | ................... | 318/701 |
| 7,570,009 B2 * | 8/2009 | Hsieh et al. | ...................... | 318/779 |
| 7,781,998 B2 * | 8/2010 | Liu et al. | ................... | 318/400.26 |
| 7,786,688 B2 * | 8/2010 | Hayashi et al. | .......... | 318/400.29 |
| 8,022,648 B2 * | 9/2011 | Ito et al. | ................... | 318/400.17 |
| 8,084,973 B2 * | 12/2011 | Hayashi | ................... | 318/400.22 |
| 2007/0116577 A1 | 5/2007 | Chen et al. | | |
| 2010/0253266 A1 * | 10/2010 | Jeung | ....................... | 318/400.26 |

* cited by examiner

*Primary Examiner* — Walter Benson
*Assistant Examiner* — Thai Dinh

(57) ABSTRACT

A fan system circuit module including a stable voltage input terminal for receiving a stable voltage, an operation unit electrically connected to the stable voltage input terminal and a drive chip. The operation unit includes a first resistor, a second resistor, a first capacitor and a third resistor. After powered on at the stable voltage, the operation unit generates an operation signal for the drive chip to decrease drive current value of the fan. In case that a lock of the fan takes place, the drive chip can effectively decrease the block current. The circuit module has soft-start function and provides block current protection effect so as to avoid malfunctioning of the fan system due to too great start current of the fan and avoid burnout of the fan due to high rise of temperature.

10 Claims, 4 Drawing Sheets

FAN SYSTEM CIRCUIT MODULE

FIELD OF THE INVENTION

The present invention relates to a circuit module, and more particularly to a fan system circuit module with soft-start function and block current protection effect.

BACKGROUND OF THE INVENTION

Following the rapid advance of modern electronic technique, more and more multifunctional, high-speed, high-power, miniaturized and compact electronic components and products have been developed. In practice, when operating at high speed, these electronic products at the same time generate high heat. Therefore, it is necessary to use a heat dissipation mechanism to immediately dissipate the heat so as to keep the electronic circuit functioning normally. A fan system is a major part of a heat dissipation mechanism. The fan system serves to create airflow for enhancing heat exchange rate so as to quickly dissipate the heat.

At subscriber end, the number of the fans of the fan system can be increased or decreased in accordance with the requirement of the subscriber end. The controlling unit or controlling chip of the fan system serves to drive the fans and control rotational speed thereof. Accordingly, the rotational speed of the fans can be adjusted in adaptation to the actual operation unit of the subscriber end.

When the fans of the fan system are started, the power supply of the fan system will supply the fans with start current and then operation current to keep the fans operating. The start current is generally more than twice the operation current.

Therefore, in the case that the fan system includes multiple fans, which are to be used at the same time, the power supply will need to supply start current for many fans. However, as foresaid, the start current is generally more than twice the operation current. Therefore, when started at the same time, the voltage of the fan system power supply will be pulled down. In this case, other equipments of the fan system can hardly normal function. Also, after started, the fans will instantly operate at full speed. The start rotational speed is so high as to make great noise. Moreover, in normal full-speed operation of the fan system, failure or so-called "lock" of the fans may happen. In the case of lock of the fans, the temperature of the fan system and the fans will highly rise to cause burnout of the fans.

According to the above, the conventional fan system circuit module has the following defects:
1. When the fans are started at the same time, the voltage of the fan system power supply will be pulled down. In this case, other equipments of the fan system can hardly normal function.
2. After started, the fans will instantly operate at full speed. The start rotational speed is so high as to make great noise.
3. In the case of lock of the fans, the temperature of the fan system will highly rise to cause burnout of the fans.

SUMMARY OF THE INVENTION

A primary object of the present invention is to provide a fan system circuit module, which is able to start multiple fans of the fan system at the same time. When started, the rotational speed of the fans is gradually increased so that the fan system will not malfunction due to too great start current of the fans.

A further object of the present invention is to provide the above fan system circuit module in which in the case of lock of the fans, the block current can be minimized to avoid too great block current of the fans and high rise of temperature so as to avoid burnout of the fans and ensure safety.

To achieve the above and other objects, fan system circuit module of the present invention includes: a stable voltage input terminal for receiving a stable voltage; an operation unit electrically connected to the stable voltage input terminal, after the operation unit is powered on at the stable voltage, the operation unit generating an operation signal; and a drive chip coupled with the operation unit and powered on at a working voltage. After receiving the operation signal, the drive chip generates a soft-start signal so as to decrease drive current value of the fan. In case a lock of the fan of the fan system takes place, the drive chip generates a block current signal to avoid too great start current of the fan and high rise of temperature so as to avoid burnout of the fan.

BRIEF DESCRIPTION OF THE DRAWINGS

The structure and the technical means adopted by the present invention to achieve the above and other objects can be best understood by referring to the following detailed description of the preferred embodiment and the accompanying drawings, wherein.

DETAILED DESCRIPTION OF THE PREFERRED EMBODIMENT

Figure 1:
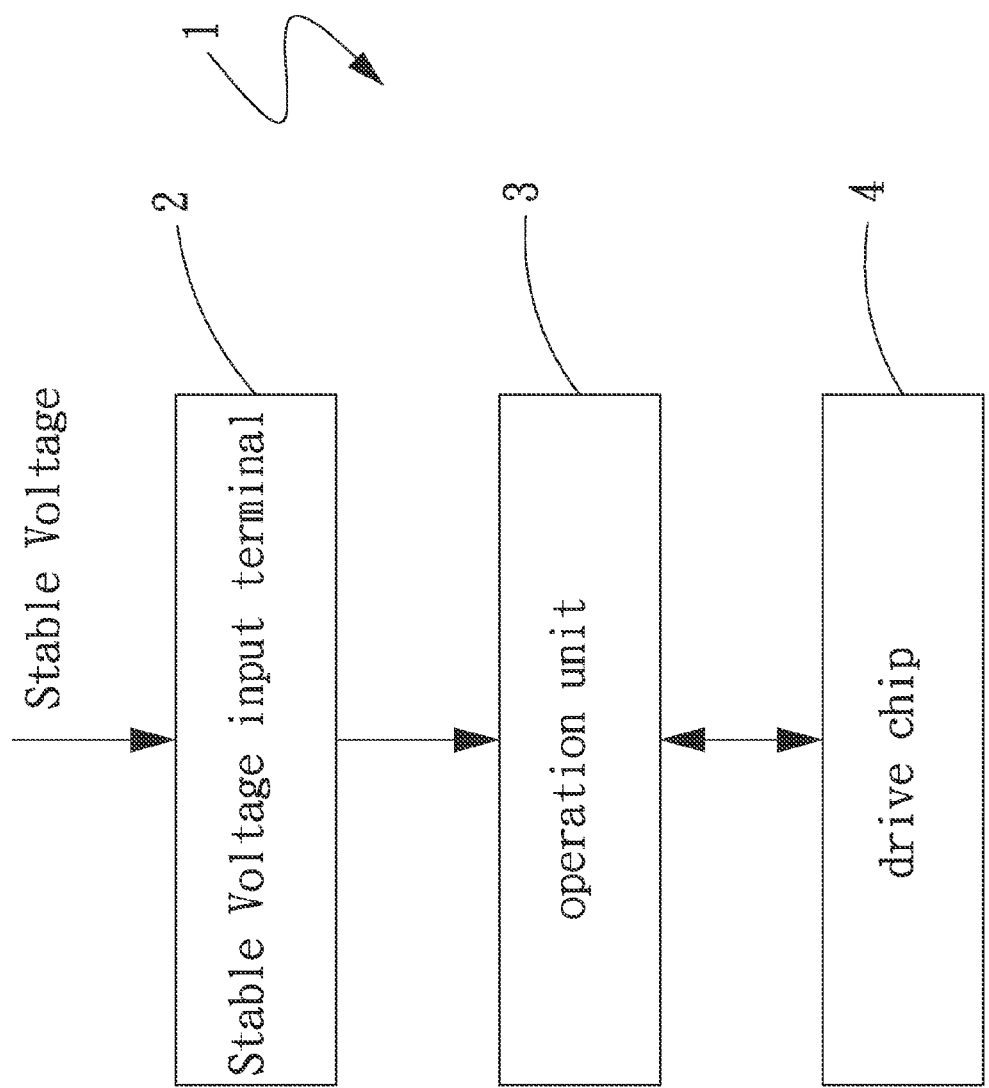
FIG. 1 is a block diagram of the fan system circuit module of the present invention.

Please refer to FIG. 1. According to a preferred embodiment, the fan system circuit module 1 of the present invention includes a stable voltage input terminal 2, an operation unit 3 and a drive chip 4. The stable voltage input terminal 2 receives stable voltage and is electrically connected to the operation unit 3 and the drive chip 4. The operation unit 3 serves to receive the stable voltage of the stable voltage input terminal 2. The operation unit 3 transmits a voltage value for the drive chip 4 to control rotational speed of the fan (not shown) of the fan system. In this embodiment, the stable voltage received by the stable voltage input terminal 2 is +6V.

Figure 2:
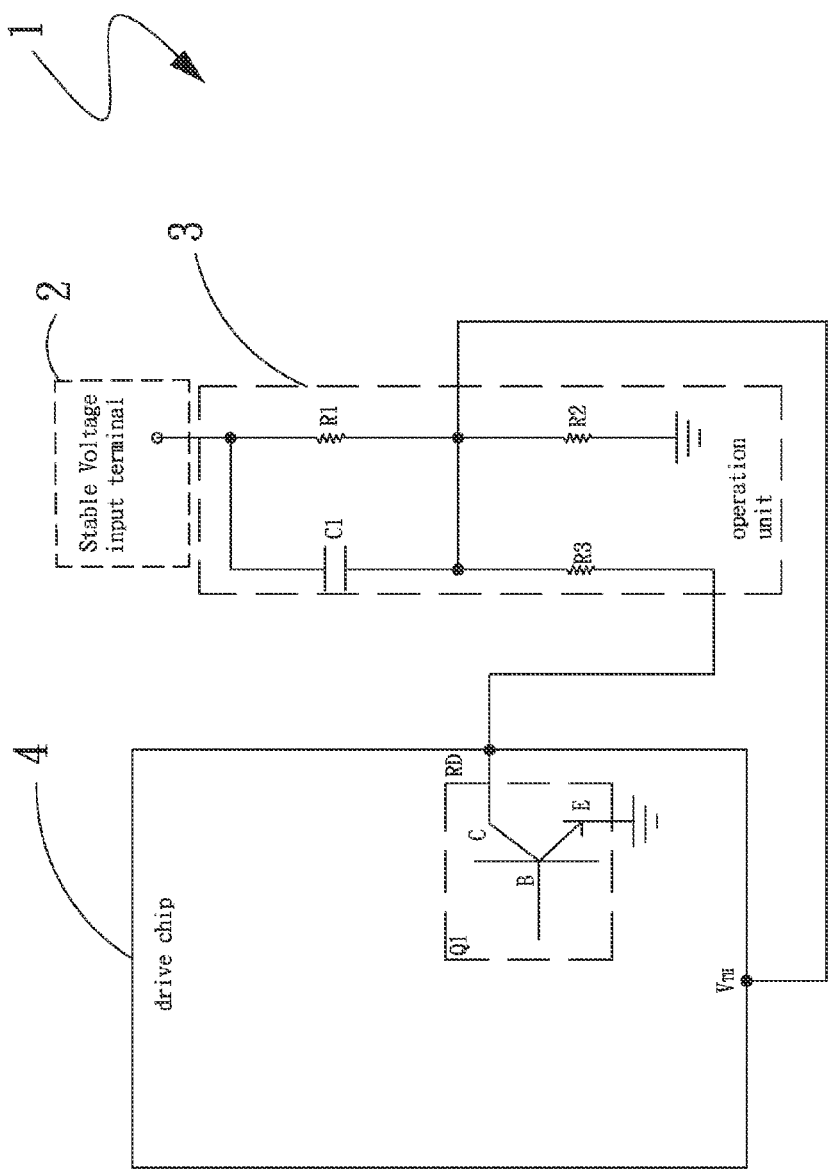
FIG. 2 is a first block circuit diagram of the fan system circuit module of the present invention.
Figure 3:
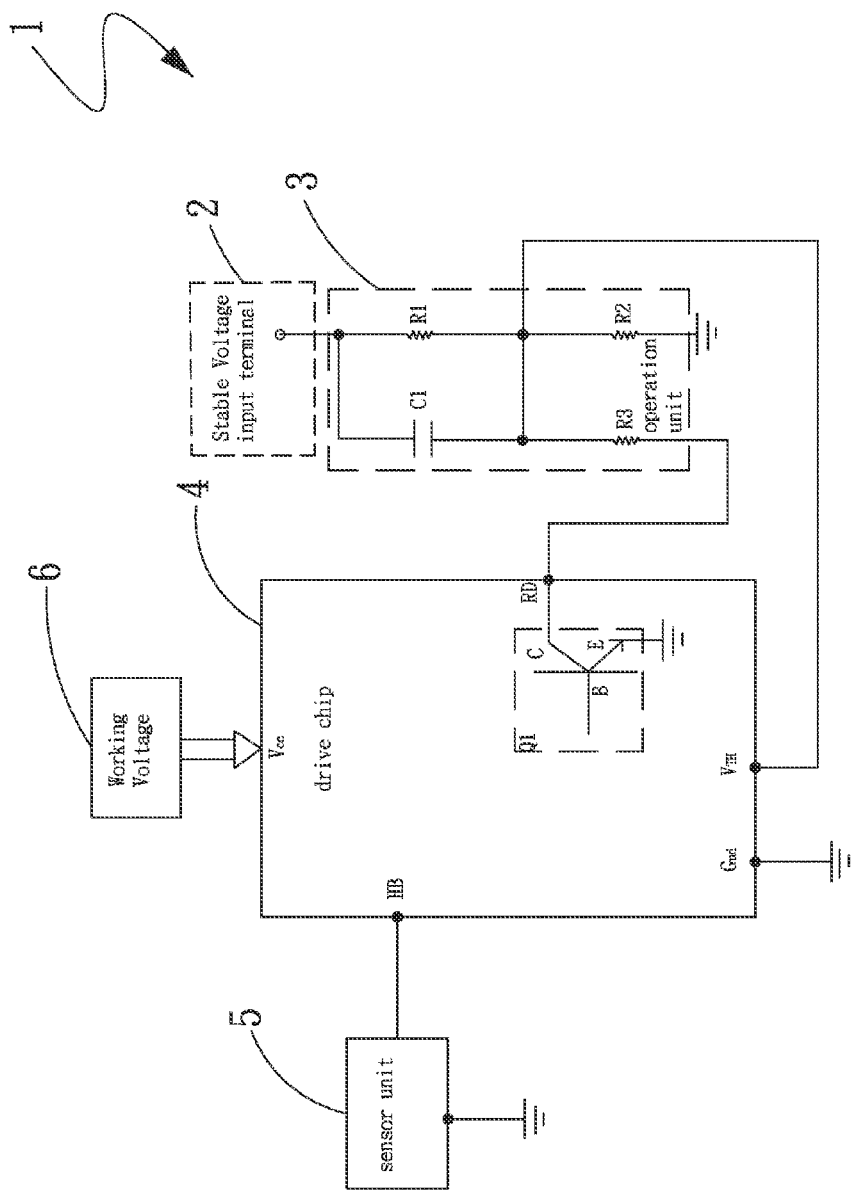
FIG. 3 is a second block circuit diagram of the fan system circuit module of the present invention.

Please refer to FIGS. 1 and 2. The operation unit 3 is electrically connected to the drive chip 4. The operation unit 3 has a first resistor R1, a second resistor R2, a first capacitor C1 and a third resistor R3. A first terminal of the first resistor R1 is coupled with the stable voltage input terminal 2 for receiving the stable voltage of +6V of the stable voltage input terminal 2. The second resistor R2 is serially connected with the first resistor R1. A first terminal of the second resistor R2 is coupled with a second terminal of the first resistor R1. In addition, the coupled terminals of the first and second resistors R1, R2 are both coupled with the drive chip 4. A second terminal of the second resistor R2 is coupled with a grounding terminal. A first terminal of the first capacitor C1 and the first terminal of the first resistor R1 are both coupled with the stable voltage input terminal 2 for receiving the stable voltage of +6V. A second terminal of the first capacitor C1 is coupled with the third resistor R3. The terminal of the third resistor R3 that is coupled with the first capacitor C1 is also coupled with the coupled terminals of the first and second resistors R1, R2. A second terminal of the third resistor R3 is coupled with the drive chip 4.

In this embodiment, the drive chip 4 is a fan drive IC mainly divided into a first connection section HB, a second connection section RD, a third connection section VTH, a fourth connection section VCC and a fifth connection section GND. The first connection section HB and the fourth connection section VCC are respectively coupled with a sensor unit 5 and a working voltage 6. The second connection section RD is coupled with the second terminal of the third resistor R3. The third connection section VTH is coupled with the coupled terminals of the first and second resistors R1, R2. The drive chip 4 has a transistor Q1 inside. In this embodiment, the transistor Q1 is a bipolar transistor having a first terminal E (emitter), a second terminal B (base) and a third terminal C (collector). The third terminal C is coupled with the second connection section RD and the second terminal of the third resistor R3.

In this embodiment, the operation and characteristics of the respective components and parts of the circuit module 1 are described as follows: The drive chip 4 is a fan drive IC. The first resistor R1 and the second resistor R2 are voltage-dividing resistors, while the third resistor R3 is a current-limiting resistor, which is connected to the third terminal C of the internal transistor Q1 of the drive chip 4. The first capacitor C1 is a capacitor of a charging loop. The lower the voltage received by the third connection section VTH of the drive chip 4 is, the higher the rotational speed of the fan drive coil of the fan system electrically coupled with the circuit module 1 is. In the case that the voltage falls within a range of 1.65V~4.65V, which is a controllable range, the rotational speed of the fan is determined by the voltage value. In the case that the voltage received by the third connection section VTH is lower than 1.65V, the fan operates at full speed.

Accordingly, in this embodiment, the working voltage 6 is applied to the fan of the fan system electrically coupled with the circuit module 1. In the instant of applying the working voltage 6, the operation unit 3 generates an operation signal indicative of the start of the fan. The drive chip 4 receives the operation signal to generate a soft-start signal with the transistor Q1 of the second connection section RD of the drive chip 4 in a cut-off state. In the instant of being powered on, the first capacitor C1 of the operation unit 3 becomes an instantaneous short circuit. The stable voltage of +6V is first supplied to the third connection section VTH and then the first capacitor C1 is gradually charged at the stable voltage of +6V. During the charging process, the voltage of the third connection section VTH is gradually decreased. As aforesaid, the lower the voltage received by the third connection section VTH is, the higher the rotational speed of the fan drive coil of the fan system electrically coupled with the circuit module 1 is. The voltage of the third connection section VTH is gradually decreased. Therefore, when started, the rotational speed of the fan is gradually increased in a soft-start manner until the voltage of the third connection section VTH is smaller than 1.65V. At this time, the fan will operate at full speed. In this embodiment, the voltage of the third connection section VTH can be calculated in the following manner: The voltage value $V_{VTH}$ of the third connection section VTH is about equal to $[(R3//R2)*6]/[(R3//R2)+R1]<1.65V$. In the case that the voltage value $V_{VTH}$ of the third connection section VTH falls within the range of 1.65V~4.65V, which is a controllable range, the rotational speed of the fan is determined by the voltage value. In the case that the voltage value $V_{VTH}$ of the third connection section VTH is lower than 1.65V, the fan operates at full speed. Accordingly, the circuit module 1 of the present invention has soft-start function to effectively reduce the current value when the fan is started. In this case, the fan system will not malfunction due to too great start current of the fan. Also, the fan will not instantaneously operate at full speed so as not to make big noise due to too high rotational speed.

After the fan of the fan system electrically coupled with the circuit module 1 is started with the soft-start signal, the transistor Q1 of the second connection section RD of the drive chip 4 is in a turn-on state. The voltage value $V_{VTH}$ of the third connection section VTH can be calculated according to the above formula. That is, the voltage value $V_{VTH}$ of the third connection section VTH is about equal to $[(R3//R2)*6]/[(R3//R2)+R1]<1.65V$. In this case, the fan of the fan system normally operates at full speed. During the normal operation at full speed, a lock of the fan may happen. In normal full-speed operation of the fan system, in case a certain fan fails and stops rotating, a lock will take place. When the lock happens, a block current is generated in the fan system. Too high block current will lead to great rise of temperature and burnout of the fan. The magnitude of the block current is determined by the voltage value $V_{VTH}$ of the third connection section VTH. The higher the voltage value $V_{VTH}$ of the third connection section VTH is, the lower the block current is. Therefore, in this embodiment, when the fan fails and stops rotating, the operation signal generated by the operation unit 3 is indicative of the failure of the fan and transmitted to the drive chip 4. The drive chip 4 generates a block current signal to make the transistor Q1 of the second connection section RD of the drive chip 4 in a cut-off state. In this state, the voltage value $V_{VTH}$ of the third connection section VTH is calculated as $R2*6/(R1+R2)>1.65V$. Therefore, in the case of lock of the fan, the voltage value $V_{VTH}$ of the third connection section VTH will instantly rise to minimize the block current. Moreover, in the case of lock, by means of adjusting the resistance values of the first and second resistors R1, R2 of the circuit module 1, the voltage value $V_{VTH}$ of the third connection section VTH can be controlled and varied. Therefore, when the lock of the fan of the fan system takes place, the drive chip 4 of the circuit module 1 generates the block current signal to raise the voltage value $V_{VTH}$ of the third connection section VTH so as to avoid too great block current and high rise of temperature and minimize the possibility of burnout of the fan.

Figure 4:
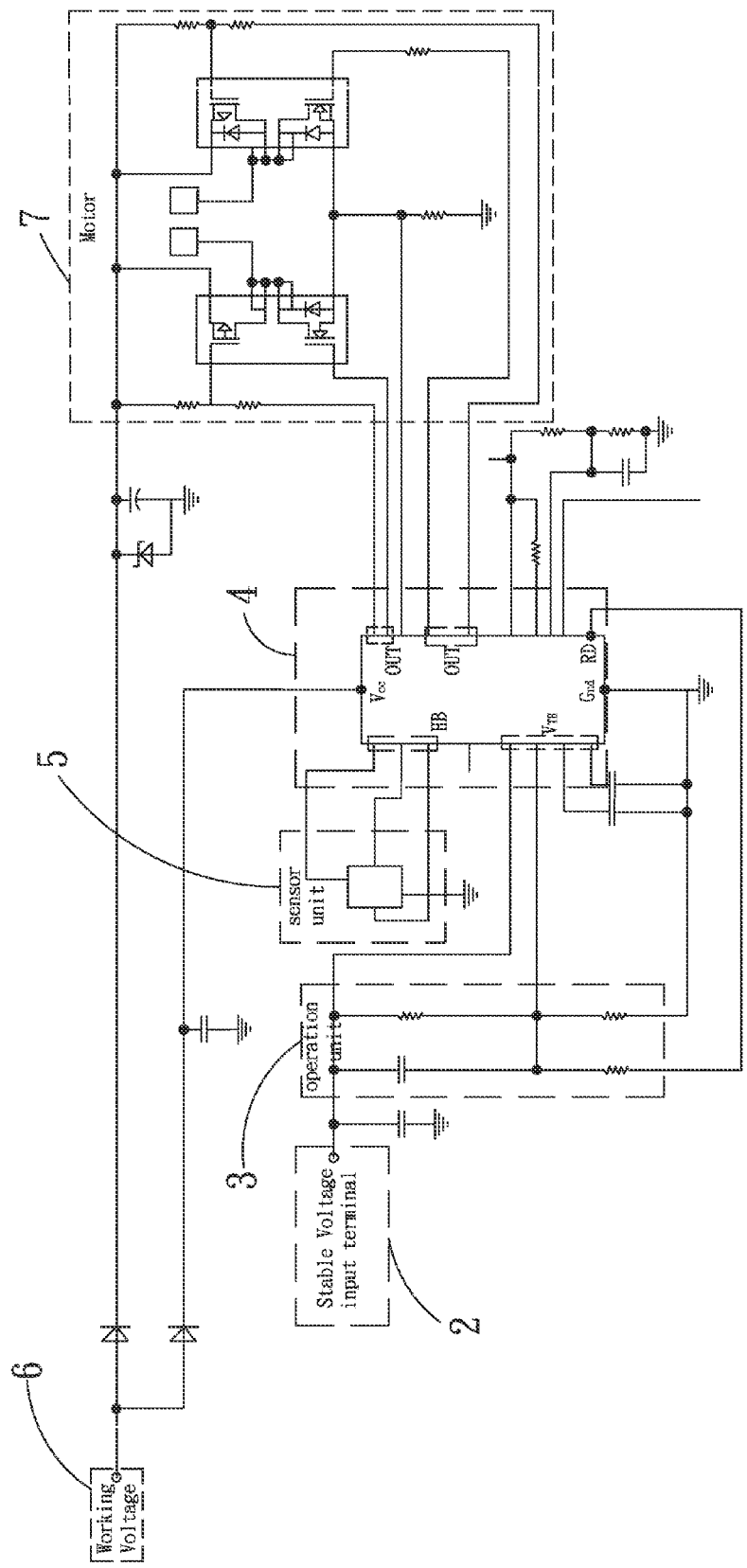
FIG. 4 is a circuit diagram of the fan system circuit module of the present invention.

Please refer to FIG. 4, which is a circuit diagram of the fan system circuit module 1 of the present invention. In this embodiment, the drive chip 4 is mainly divided into a first connection section HB, a second connection section RD, a third connection section VTH, a fourth connection section VCC and a fifth connection section GND and at least one sixth connection OUT. The first connection section HB is coupled with a sensor unit 5. The second connection section RD and the third connection section VTH are respectively coupled with the third resistor R3 and the coupled terminals of the first and second resistors R1, R2 of the operation unit 3. The fourth connection section VCC coupled with the working voltage 6. The fifth connection section GND is grounded. The sixth connection section OUT is coupled with a motor 7. The sensor unit 5 serves to detect change of external magnetic field and then output a sensing signal to the drive chip 4 for the drive chip 4 to drive the motor 7 via the sixth connection section OUT. In the instant of applying the working voltage 6 to the fan, the operation unit 3 generates an operation signal to make the drive chip 4 generate a soft-start signal with the transistor Q1 of the second connection section RD of the drive chip 4 in a cut-off state. In the instant of being powered on, the first capacitor C1 of the operation unit 3 becomes an instantaneous short circuit. The stable voltage of +6V is first supplied to the third connection section VTH and then the first capacitor C1 is gradually charged at the stable voltage of +6V. During the charging process, the voltage of the third connection section VTH is gradually decreased. Therefore, when started, the rotational speed of the fan is gradually increased in a soft-start manner. Accordingly, the fan system will not malfunction due to too great start current of the fan. Also, the fan will not instantaneously operate at full speed so as not to make big noise due to too high rotational speed. In normal full-speed operation of the fan system, a lock of the fan may happen. In the case of lock of the fan, a block current is generated in the fan system. Therefore, when the fan fails and stops rotating, the operation signal generated by the operation unit 3 is indicative of the failure of the fan and transmitted to the drive chip 4. The drive chip 4 generates a block current signal to make the transistor Q1 of the second connection section RD of the drive chip 4 in a cut-off state. The voltage value $V_{VTH}$ of the third connection section VTH will instantly rise to minimize the block current and avoid too great block current of the fan and high rise of temperature so as to avoid burnout of the fan.

According to the aforesaid, the fan system circuit module of the present invention has the following advantages:

1. By means of the circuit module of the present invention, the fan is started in a soft-start manner. Therefore, when started, the fan system will not malfunction due to too great start current of the fan.
2. When started, the rotational speed of the fan is gradually increased. Therefore, the fan will not instantly operate at full speed so as not to make big noise due to too high rotational speed.
3. In the case of lock of the fan, the block current can be minimized to avoid too great block current of the fan and high rise of temperature so as to avoid burnout of the fan.
4. The number of the utilized electronic components is reduced so as to lower the cost.

The present invention has been described with a preferred embodiment thereof and it is understood that many changes and modifications in the described embodiment can be carried out without departing from the scope and the spirit of the invention that is intended to be limited only by the appended claims.

What is claimed is:

1. A fan system circuit module comprising:
   a stable voltage input terminal for receiving a stable voltage;
   an operation unit electrically connected to the stable voltage input terminal, after the operation unit is powered on at the stable voltage, the operation unit generating an operation signal;
   a drive chip coupled with the operation unit for receiving the operation signal to generate a soft-start signal so as to decrease drive current value of the fan, a lock of the fan of the fan system takes place, the drive chip generating a block current signal to decrease block current so as to avoid too great start current of the fan or burnout of the fan;
   wherein the operation unit includes:
      a first resistor, a first terminal of the first resistor being coupled with the stable voltage input terminal for receiving the stable voltage;
      a second resistor, a first terminal of the second resistor being coupled with a second terminal of the first resistor, the coupled terminals of the first and second resistors being both coupled with the drive chip, a second terminal of the second resistor being coupled with a grounding terminal;
      a first capacitor, a first terminal of the first capacitor and the first terminal of the first resistor being both coupled with the stable voltage input terminal for receiving the stable voltage; and
      a third resistor, a first terminal of the third resistor being coupled with a second terminal of the first capacitor and also coupled with the coupled terminals of the first and second resistors, a second terminal of the third resistor being coupled with the drive chip.

2. The fan system circuit module as claimed in claim 1, wherein the first capacitor is gradually charged at the stable voltage.

3. The fan system circuit module as claimed in claim 1, wherein the drive chip includes:
   a first connection section coupled with a sensor unit;
   a second connection section coupled with the second terminal of the third resistor;
   a third connection section coupled with the coupled terminals of the first and second resistors;
   a fourth connection section coupled with a working voltage; and
   a fifth connection section coupled with a grounding terminal.

4. The fan system circuit module as claimed in claim 3, wherein the drive chip further includes at least one sixth connection section coupled with a motor.

5. The fan system circuit module as claimed in claim 3, wherein the drive chip has a transistor having a first terminal, a second terminal and a third terminal, the third terminal being coupled with the second connection section.

6. The fan system circuit module as claimed in claim 5, wherein after the soft-start signal is generated, the transistor is in a cut-off state.

7. The fan system circuit module as claimed in claim 5, wherein after the block current signal is generated, the transistor is in a cut-off state.

8. The fan system circuit module as claimed in claim 5, wherein the transistor is a bipolar transistor, the first terminal of the transistor being an emitter, the second terminal of the transistor being a base and the third terminal of the transistor being a collector.

9. The fan system circuit module as claimed in claim 3, wherein the sensor unit serves to detect change of external magnetic field and then generate a sensing signal, the sensing signal being transmitted to the drive chip through the first connection section.

10. The fan system circuit module as claimed in claim 1, wherein the working voltage is applied to the drive chip.

* * * * *